Charles J. Kunz
INVENTOR.

3,132,785
ROLLER DRIVE SYSTEM
Charles J. Kunz, Rochester, N.Y., assignor to Eastman Kodak Company, Rochester, N.Y., a corporation of New Jersey
Filed Mar. 5, 1962, Ser. No. 177,631
9 Claims. (Cl. 226—108)

This invention relates generally to drive mechanisms, and more specifically to an improved pulley-belt drive system for driving a plurality of web transport rollers.

In roller-transport mechanisms for processors and the like, of the type normally having a plurality of pairs of opposed transport rollers, it is desirable to permit the transport rollers to separate to accommodate material of varying thicknesses without disconnecting or in any way affecting the relationship between the drive system and the transport rollers. In transport systems for transporting a material along a horizontal path, it is normally sufficient to merely drive the lower transport roller of each pair of opposed rollers, the upper roller merely functioning as an idler roller for holding the material into engagement with the lower driven roller by means of its weight. Difficulties arise, however, in transport systems for transporting a material along a vertical path since it is not possible to utilize directly the weight of any of the rollers in each pair of opposed rollers to maintain the material in driving relation with the driven rollers, and hence for best results it is necessary to drive each of the transport rollers. This, however, presents problems, particularly when materials of varying thicknesses are transported, since this necessitates separation of the rollers from one another to accommodate the material. This roller separation deleteriously affects, and in some instances disconnects the drive system from the rollers in those cases where the drive system normally comprises meshing gears, chain and sprockets, or belt and pulleys. Applicant's improved drive system for a transport mechanism is believed to eliminate this and other problems of the normal drive system.

It is therefore one of the primary objects of this invention to provide an improved drive system comprising opposed drive rollers for a web in which the drive connection between the drive rollers and the web is not broken, interrupted or deleteriously affected by separation of the drive rollers.

Another object of this invention is to provide an improved drive system for driving pairs of opposed rollers in a web transport mechanism in which the drive connection to the driven rollers is not broken, interrupted, or deleteriously affected by intermittent separation of the opposed rollers to accommodate material of varying thicknesses.

Another object of the invention is to provide an improved drive system for a web transport mechanism that is of simple design and construction, thoroughly reliable and efficient in operation, and economical to manufacture.

A more specific object of the invention is to provide an improved drive system for a web roller-transport mechanism or the like having opposed pairs of pulleys, one pulley of each pair having a pair of axially spaced peripheral treads, and the other pulley having a peripheral tread axially disposed between the pairs of treads on the companion roller, the treads further being arranged so that a drive belt passing between the treads for imparting motion to the pulleys and transport rollers is flexed to accommodate separation of the rollers without disrupting the drive connection between the belt and treads.

Still another object of the invention is to provide an improved drive system for a web transport mechanism or the like having a plurality of pairs of opposed pulleys, and a drive belt passing therebetween to impart movement to the pulleys, said pairs of pulleys further arranged to alternately flex the drive belt first in one direction and then in the opposite direction.

Objects and advantages other than those set forth above will be apparent from the following description when read in connection with the accompanying drawing, in which.

Figure 3:
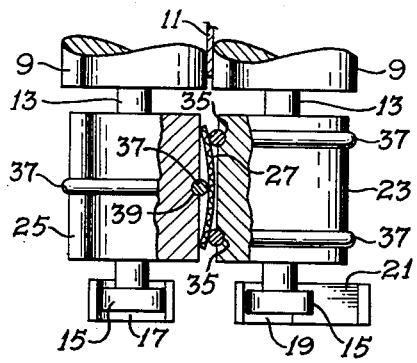
FIG. 3 is a fragmentary view taken along line 3—3 of FIG. 2 with portions thereof broken and sectioned.
Figure 4:
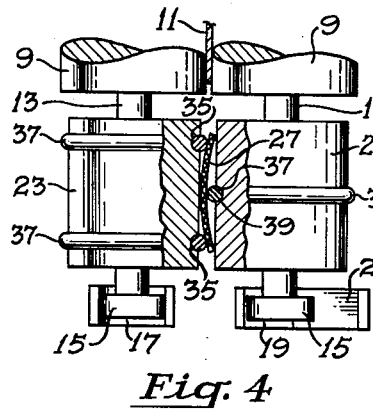
FIG. 4 is a view similar to FIG. 3 taken along line 4—4 of FIG. 2.
Figure 5:
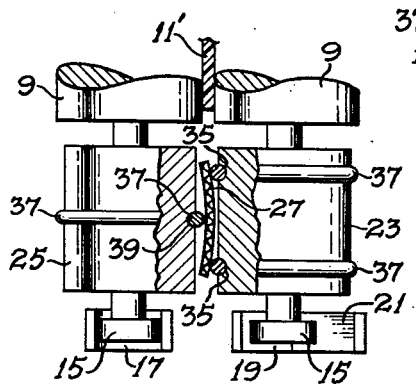
FIG. 5 is a view similar to FIG. 3 showing a portion of the drive system when a material of increased thickness is being transported.
Figure 1:
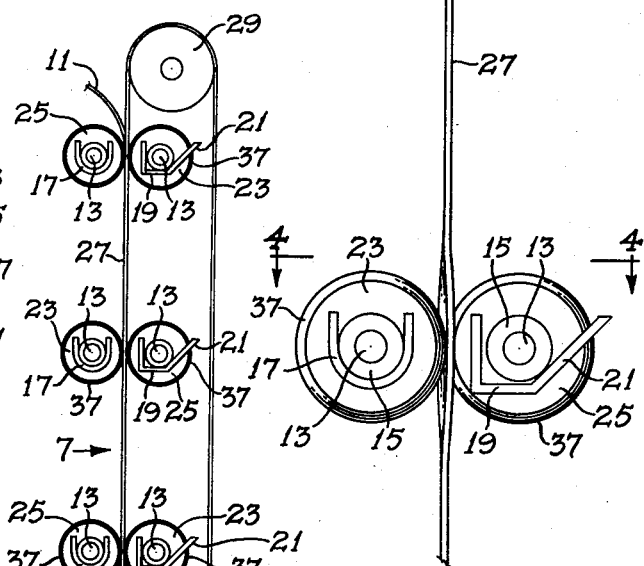
FIG. 1 is a side elevation view of a drive system constructed in accordance with a preferred embodiment of the invention.

With reference to the drawing, a preferred embodiment of this invention is illustrated in connection with a transport mechanism 7 (FIG. 1) comprising pairs of opposed, identical transport rollers 9 (see FIGS. 3 and 4) for transporting a web of material 11 along a vertical path. Since the opposite or driven ends of each pair of rollers 9 are identical, only one of the ends is shown. Each of the transport rollers 9 has a shaft 13 and a bearing 15 mounted at each end. For each specific pair of rollers 9 the bearings 15 of one of the rollers are mounted in U-shaped yokes 17, and the bearings 15 of the other roller are mounted in yokes 19 having a ramp 21 adapted to permit lateral movement of the bearings 15 therealong upon separation of the transport rollers 9 to accommodate webs of material 11 and 11' of different thicknesses transported therebetween. The yokes 17, 19 are secured to a suitable frame, not shown. On one of each pair of rollers 9, a pulley 23 is mounted on shaft 13 in a position interposed between the bearing 15 and one end of the transport roller 9, and another pulley 25 is mounted on the shaft 13 of the other roller 9 in axial register therewith as seen in FIGS. 3-5. The pulleys 23, 25 are driven by a continuous belt 27, such as a woven cotton belt, passing between the pulleys, and over an idler pulley 29 and a drive pulley 31, which is driven by any suitable motor 33.

Figure 2:
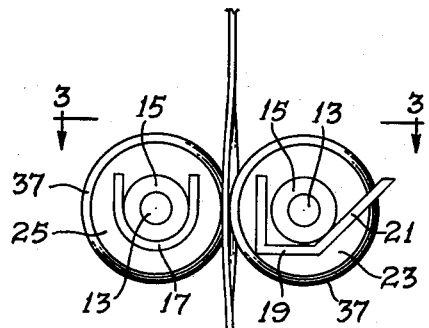
FIG. 2 is an enlarged fragmentary view of the drive system of FIG. 1.

Considering the drive system in further detail, as seen in FIGS. 3-5, pulley 23 has a pair of axially spaced peripheral grooves 35 for receiving a rubber tread or O-ring 37 mounted in each groove. The opposite pulley 25 has a single peripheral annular groove 39 which is positioned intermediate the other grooves 35, and also receives a rubber tread or O-ring 37. Although it may be preferable to have the outer diameter of the treads 37 equal to the diameter of the transport rollers 9, this is not essential, and the diameter of the treads may be slightly greater or less than the diameter of the transport rollers 9, as long as the treads 37 co-operate to flex the belt 27 as it passes between the pulleys 23, 25. It is possible to alter or reverse the direction of flexing by alternating the pulleys 23, 25 from one group to the next as seen in FIGS. 3 and 4. The effect of this alternation is to cause the belt 27 to flex first in one direction and then in the other direction as shown in FIG. 2, thus insuring that the belt will not attain a permanent set, thereby destroying the flexibility of its operation. In addition, the transport rollers 9 may be separated different amounts, as seen in FIGS. 3 and 5, to accommodate material 11, 11' of varying thicknesses without breaking or in any way interfering with the effectiveness of the drive system. Similarly, the web drive of the present invention is effective to maintain rotation of the rollers 9 when there is no material 11, as will occur between materials 11 and 11' of different thicknesses.

Although the preferred embodiment is shown in connection with a transport system in which the drive pulley 31 drives the belt 27 and the belt 27 drives the pulleys 23, 25, it is of course obvious that in its broader application the reverse may be true. For instance, the pulleys 23 and 25 which are permanently located in the yokes 17 may be driven by any suitable drive means to function as drive pulleys, for transporting a belt or web therebetween. In such a drive system, the driving connection between the web and pulleys would not be disrupted upon a limited separation of the pulleys for the same reasons as indicated heretofore.

Although only two embodiments have been illustrated and described, it will be apparent to those skilled in the art that various changes and modifications may be made therein without departing from the spirit of the invention or from the scope of the appended claims.

I claim:

1. In a drive mechanism for a flexible web, the combination comprising:
   a pair of spaced apart, opposed rollers between which said web is transported, one of said rollers adapted to be moved relative to the other within a predetermined range for varying the space therebetween;
   a driving belt;
   means on one of said rollers drivingly engaged by one side of said driving belt; and
   means on said other roller drivingly engaged by the opposite side of said driving belt, said means on said rollers co-operating to flex said driving belt in the direction of said relative movement whereby the driving relationship between said driving belt and said means on said rollers is maintained for said predetermined range of said relative movement of said rollers.

2. The invention according to claim 1 wherein said pair is horizontally disposed to transport said web vertically and support means of said one roller include a ramp whereby the weight of said one roller biases said means into co-operation with said driving belt.

3. The invention according to claim 1 wherein said means on one of said rollers includes axially spaced first peripheral projections, and said means on said other roller includes a second peripheral projection axially spaced between said first projections.

4. The invention according to claim 3 wherein said first and second projections comprise O rings embracing the peripheries of said rollers.

5. In a drive mechanism, the combination comprising:
   an endless flexible drive belt;
   a first pair of spaced apart opposed rollers between which discrete lengths of web material are drivable thereby, one of said rollers of said first pair being adapted to be moved laterally relative to the other within a predetermined range for varying the space therebetween in accordance with the thickness of the web material;
   means on said rollers of said first pair co-operating to flex said belt transversely in one direction during passage therebetween;
   a second pair of spaced apart opposed rollers spaced from said first pair and receptive of said discrete lengths from said first pair in a driving relationship;
   one of said rollers of said second pair adapted to be moved laterally relative to the other within said predetermined range for similarly varying the space therebetween;
   means on said rollers of said second pair receptive of said belt and co-operating to flex said belt transversely in a direction opposite to said one direction whereby said belt does not develop a permanent set; and
   means for driving said belt to drive said rollers for conveying said discrete lengths therebetween.

6. The invention according to claim 5 wherein said means on said rollers of said first pair comprises axially spaced peripheral projections on one roller engaging one side of said belt, and a peripheral projection axially spaced between said spaced projections on the other roller engaging the opposite side of said belt, and said means on said rollers of said second pair comprises axially spaced projections on one roller engaging said opposite side of said belt, and a peripheral projection axially spaced between said spaced projections on the other roller engaging said one side of said belt.

7. The invention according to claim 6 wherein said projections of said first and second pairs comprise O rings embracing the peripheries of said rollers.

8. In a drive mechanism including a driving means which energizes an endless flexible drive belt, means driven by the drive belt comprising:
   at least two vertically spaced pairs of spaced apart rollers opposed in substantially parallel relationship;
   pulley means secured to each of said rollers between which the belt passes, one roller of each of said pairs being movable relative to the other roller of that pair in a plane transverse to the belt and within a predetermined range for varying the space between said pair and said pulleys thereof;
   axially spaced peripheral projections on one pulley of each of said pair of rollers drivingly engaged by one side of the belt; and
   a peripheral projection on the other pulley of each of said pair of rollers axially spaced between said spaced projections and drivingly engaged by the opposite side of the belt, said peripheral projections of one pair of pulleys co-operating to flex the belt transversely in one direction, and said peripheral projections on the second pair of pulleys co-operating to flex the belt transversely in the opposite direction whereby the driving relationship between the belt and said projections is maintained for said predetermined range of said relative movement of said rollers, and the belt does not develop a permanent set.

9. The invention according to claim 8 wherein said peripheral projections of each pair comprise O rings embracing the peripheries of said pulleys.

References Cited in the file of this patent

UNITED STATES PATENTS

| | | |
|---|---|---|
| 2,457,319 | Rackett | Dec. 28, 1948 |
| 2,493,479 | Eggleston | Jan. 3, 1950 |
| 2,528,865 | Dale | Nov. 7, 1950 |
| 2,538,520 | Holt et al. | Jan. 16, 1951 |